United States Patent [19]

Longacre, Jr.

[11] Patent Number: 4,535,758

[45] Date of Patent: Aug. 20, 1985

[54] SIGNAL LEVEL CONTROL FOR VIDEO SYSTEM

[75] Inventor: Andrew Longacre, Jr., Skaneateles, N.Y.

[73] Assignee: Welch Allyn Inc., Skaneateles Falls, N.Y.

[21] Appl. No.: 540,137

[22] Filed: Oct. 7, 1983

[51] Int. Cl.³ .............................................. A61B 1/04
[52] U.S. Cl. ......................................... 128/6; 358/98; 358/168
[58] Field of Search .................. 128/6, 7, 8, 9; 358/98, 358/39, 41, 42, 161, 163, 164, 168, 169, 170, 174, 176, 179

[56] References Cited

U.S. PATENT DOCUMENTS

| | | | |
|---|---|---|---|
| Re. 31,289 | 6/1983 | Moore et al. | 128/6 |
| Re. 31,290 | 6/1983 | Moore et al. | 128/6 |
| 3,009,989 | 11/1961 | Ahrons et al. | 358/168 X |
| 3,879,637 | 4/1975 | Woodworth | 358/170 X |
| 3,970,777 | 7/1976 | Bradford et al. | 358/170 X |
| 4,074,306 | 2/1978 | Kakinuma et al. | 128/6 X |
| 4,423,436 | 12/1983 | Kimura | 358/98 |
| 4,475,539 | 10/1984 | Konomura | 128/6 |

Primary Examiner—William H. Grieb
Attorney, Agent, or Firm—Bruns and Wall

[57] ABSTRACT

An automatic signal level control for use in a video system using a solid state imager capable of integrating pulsed light images of a target imaged thereon. An automatic gain control is used to adjust the gain of a variable gain amplifier in the output circuit of the image sensor. A strobe lamp is used to illuminate the target during each imaging sequence. The feedback signal to the amplifier is compared to an upper and lower threshold and, in response thereto, the number of pulses generated during each illumination sequence are adjusted to maintain the video signal levels within a desired operating range.

12 Claims, 1 Drawing Figure

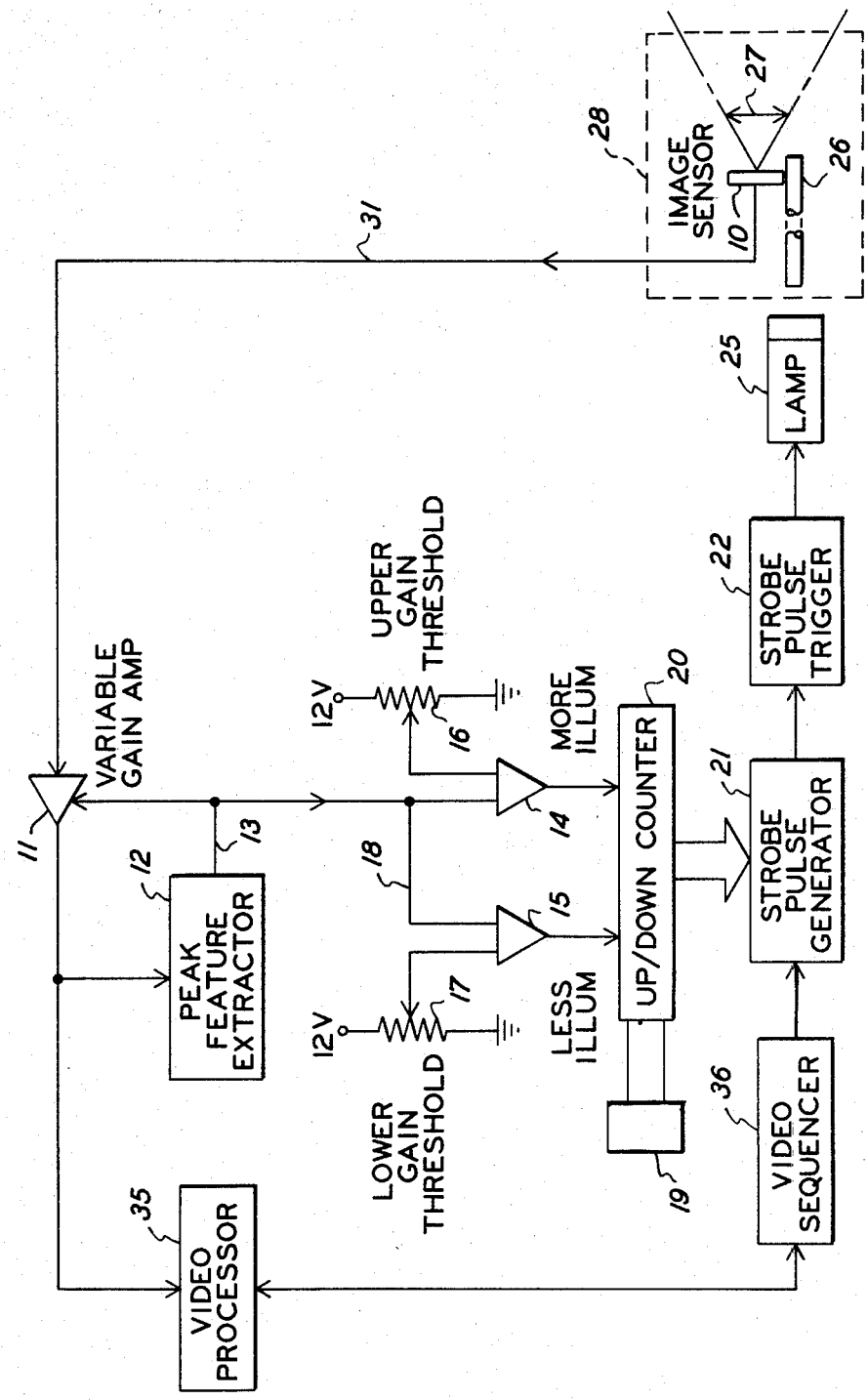

SIGNAL LEVEL CONTROL FOR VIDEO SYSTEM

BACKGROUND OF THE INVENTION

This invention relates to an endoscope that is equipped with a video readout for providing television pictures of a remote target and, in particular, to an automatic signal level control for use in a video-equipped endoscope.

With the development of solid state image sensors, sometimes referred to as charge coupled devices (CCD), it is now possible to equip the insertion head of an endoscope with an extremely small video camera that permits the head to be passed into confined regions that have heretofore been inaccessible to this type of viewing equipment. The camera generally contains a single black and white image sensor that is capable of integrating the recorded image data that is acquired during each imaging sequence. Full color video pictures of the target can also be created using a single imager by illuminating the target sequentially with light of primary colors to produce a series of color separated images. The primary colors of red, green and blue are generally used for this purpose. After each color separated image is recorded, the image data is clocked out of the image sensor and delivered to a video processor where the combined data is placed in a format suitable for display on a television screen.

As explained in greater detail in reissued U.S. Pat. Nos. Re. 31,289 and Re. 31,290 to Moore et al, three individual lamps can be used to illuminate the target with light of the primary colors to provide the desired color separation. In a further U.S. Pat. No. 4,074,306 to Kakinuma et al, there is described a video-equipped endoscope that employs a single lamp that operates in conjunction with color wheel to provide color separation. In the latter embodiment, the color-separated images are laid down in series, one over the other, upon a Braun tube to create a color picture of the target so that registration of the images and attaining proper balancing of the primary colors is extremely difficult. A single-lamp illumination system that avoids the difficulties found in the Kakinuma et al device is disclosed in co-pending U.S. application Ser. No. 487,070 filed April 21, 1983 in the name of Sarofeen et al. In the Sarofeen system, the output of the lamp is closely controlled during each color separation imaging sequence so that the color appearing in the video picture are proportionally balanced to provide a faithful rendition of the original scene.

As is well known in the art, the viewing head of the endoscope is mounted at the distal end of the insertion tube and is generally required to operate within a very confined area having little, if any, ambient light. This is particularly true when the instrument is used in a medical application. Light is generally brought into the image region by means of a fiber optic bundle. As the head is moved towards or away from a given target situated in this relatively confined region, the amount of light reflected from the target back to the image sensor will vary dramatically. Although an automatic gain control circuit may be included in the video section of the instrument, this in itself may not be sufficient to prevent the sensor from becoming saturated with light (blooming) when the head is moved close to the target. By the same token, the amount of light that can be transmitted into the target region by the fiber bundle is limited and consequently, the gain of the video signal can fall to a level where background noise is visible when the head is moved a relatively short distance away from the target.

BRIEF DESCRIPTION OF THE DRAWINGS

For a better understanding of these and other objects of the present invention, reference is had to the following detailed description of the invention which is to be read in conjunction with the accompanying drawing wherein there is shown an electrical diagram showing the subject invention embodied in a video-equipped endoscope for providing a video picture of a remote target.

SUMMARY OF THE INVENTION

It is an object of the present invention therefore to improve means for automatically controlling the video signal level of a television system.

Another object of the present invention is to provide a video signal level control to a video-equipped endoscope.

Yet another object of the present invention is to automatically control both the video gain and the illumination intensity of a video system to maintain the signals at an optimum level.

A further object of the present invention is to improve a video-equipped endoscope by providing an automatic gain control for holding the video signal level within an optimum range and a target illumination control for automatically adjusting the illumination level in the event the signal level moves outside of the optimum range.

A still further object of the present invention is to provide an automatic video gain control and an automatic light control for a video-equipped endoscope that are arranged to act in cooperation to maintain the video signal level within optimum limits as the viewing head of the instrument is maneuvered within a confined region.

These and other objects of the present invention are attained by means of a video system suitable for use in an endoscope that includes both an automatic video gain control and an automatic light control for illuminating a target which act in conjunction to control the video signal level within an optimum range.

DESCRIPTION OF THE INVENTION

With reference to the drawing, there is shown an automatic signal level control for use in a video-equipped endoscope that is capable of providing a video picture of a remote target. As described in greater detail in the previously noted Moore et al patents, a solid state image sensor 10 is positioned at the distal end of an insertion tube 28 so that the recording surface of the sensor is able to view a target 27. Typically, the target is located in a remote region and, as a consequence, little or no ambient light is available for target illumination. As explained by Moore et al, light is brought into the target region from an outside source, such as arc lamp 25, via a fiber optic bundle 26. In the present embodiment of the invention, a single lamp is utilized which is capable of being strobed rapidly to illuminate the target with a series of light pulses during each imaging sequence. An imaging sequence for the purpose of this disclosure shall be considered to be one video field. It should be recognized, however, that a color wheel might be placed in front of the lamp and adapted, as disclosed by Sarofeen et al, to sequentially illuminate the target with light of different primary colors to create color separated images of the target. The separated images can be later recombined to create a full color video picture of the target.

Preferably the image sensor is a charge coupled device (CCD) that integrates reflected light images incident thereon when recording a given picture during each imaging sequence. Accordingly, the strobe lamp can be pulsed many times during each picture taking sequence to obtain peak total brightness while using a relatively small arc. As should be evident, the cross sectional area of the light transmitting bundle 26 is generally limited by the amount of space available within the insertion tube. The bundle therefore cannot effectively at times deliver all the energy required for target illumination in a single burst of energy. It has been found that by pulsing the lamp rapidly during the imaging sequence, peak brightness can be attained with a minimum of light loss and without an appreciable heat build-up in and about the target region. This latter point is important when the instrument is being used in a medical application for viewing a confined body cavity.

In practice, the solid state image sensor converts the recorded image data to a video output signal that is transmitted to a video processor 35 via a video line 31. The signals, in the processor, are placed in a desired format that is compatible with a television system so that the recorded data can be either displayed on a television screen or stored, or video taped for future viewing. The video signals clocked out of the image sensor 10 passes early in the processing through a variable gain amplifier 11. The output of the amplifier is monitored by a peak feature extractor 12 that provides a feedback control signal to the amplifier via line 13. The amplifier and the peak feature extractor form a conventional automatic gain control (AGC) loop that might be adjusted, for example, to provide a 1 volt peak-to-peak output from a wide range of input signals.

Beyond circuit limitations, there are other considerations that might constrain the usable operating range of the AGC in an endoscope environment. If, for instance, the viewing head of the instrument is moved close to the target, areas on the image sensor can become saturated with light and the gain control, in an effort to compensate for this over illumination, will be set so low as to unnecessarily darken the useful non-saturated areas. On the other hand, when the viewing head is moved far enough away from the target so that the limited amount of available light is not sufficient to provide optimum target illumination, the AGC will raise the signal output level to a point where unwanted background noise is enhanced and thus presented on the picture screen. Usually the gain control is preset to operate within a range below saturation and above the background noise level. However, these limits can be readily exceeded as the viewing head is maneuvered within a confined region and, accordingly, the level of illumination must be altered to hold the video signals within the desired operating range.

As will be explained in greater detail below, the present technique couples the AGC loop with an automatic light control to alter the amount of illumination provided to the target during each illumination sequence in the event the gain control is unable to hold the video signal level within the optimum range. The AGC feedback signal is monitored by a pair of analog comparators 14 and 15 through means of an input lead 18. A lower gain threshold is set into comparator 15 by adjustable resistor 17. The lower gain threshold is set so that the comparator 15 turns on when the video signal rises to a point just below that at which the image sensor becomes saturated with light and at which the image sensor begins to bloom. When the feedback signal reaches the lower threshold level and the comparator turns on, an incrementing signal is sent to the downstream up/down counter 20 causing the counter to decrease the count by one unit. The up/down counter 20, in turn, is arranged to control a strobe pulse generator 21 in the lamp drive circuit. The generator strobes the lamp a number of times equal to the count provided by the counter. A controller 19 is operatively connected to the counter which allows a maximum and a minimum count to be set into the counter so that the operating capabilities of the system are not exceeded.

The pulse generator is enabled by a signal from the video sequencer 36. The sequencer enables the generator at the beginning of a video field and allows the generator to strobe the lamp a preset number of times during the field period. Once the count is reached, the generator shuts down and will not be enabled again until a new imaging sequence is begun at the start of a subsequent field.

Similarly, an upper gain threshold is set into comparator 14 by means of adjustable resistor 16. Here again the upper threshold is set so that the comparator is turned on when the gain applied to the video signal reaches a point just below that at which background noise starts to interfere with the picture. At this time, comparator 14 turns on and sends a signal to the counter 20 that increases the count by one unit and thus increases the amount of illumination transmitted to the target during the illumination sequence.

As a result of this monitoring technique, the image brightness falling on the solid state image sensor is automatically controlled to maintain the video output signal level within an optimum range during all phases of an endoscope examination. During this process, the intensity of the illumination is varied in discrete steps when the automatic gain control is usable to hold the signal level within the desired range. Through the combined operation of the automatic gain control and the automatic light control, the video signal level can be maintained within optimum operating range as the viewing head of the instrument is relocated in regard to a given target to achieve high quality video pictures over a wide variation in scenes.

While this invention has been described with special reference to the embodiment herein disclosed, it should be evident that the invention is broad enough to cover any modifications or changes that might come within the scope of the following claims.

I claim:

1. An automatic signal level control for use in a video system wherein a solid state image sensor records light images of a remote target and provides video signals indicative of the target information that includes
a variable gain amplifier for adjusting the level of the video signal delivered to the video processor,
an automatic gain control circuit for sensing the level of the video signal output of the amplifier and providing a feedback signal to the amplifier for maintaining the level of the said video signal within an optimum range,
a strobe lamp for illuminating a target within the viewing range of the sensor, said lamp having a programmable lamp drive for adjusting the pulse rate of the lamp to control the amount of illumination falling on the target during each imaging sequence, a comparator means for sensing the level of the feedback signal in the gain control circuit and providing a first output signal when the gain level falls below a lower threshold level and a second output signal when the gain level rises above an upper threshold level, and control means responsive to the comparator means output for programming the lamp drive to increase the pulse rate when the gain exceeds the upper threshold level and to decrease the pulse rate when the gain falls below the lower threshold level whereby the video signal level is maintained within the desired optimum range.

2. The signal level control of claim 1 wherein said comparator means includes a first comparator that changes its output state when the feedback level reaches the upper threshold level and a second comparator that is arranged to change its output state when the feedback level reaches the lower threshold level.

3. The signal level control of claim 2 that further includes a counter means for coupling a pulse generator in the lamp drive to said first and second comparators, said counter being responsive to the output of said comparators to increase the number of illumination pulses in steps of one so long as the first comparator is in its charged state and to decrease the number of illumination pulses in steps of one so long as the second comparator is in its charged state.

4. The signal level control of claim 3 that further includes a video sequencer for enabling the counter at the start of the illumination period within each video field.

5. The signal level control of claim 1 wherein the image sensor is a charge coupled device that integrates the light images recorded thereon, and the comparator means is set to reduce the pulse rate of the generator before the image sensor is saturated with illumination.

6. The signal level control of claim 1 that further includes a fiber optic bundle for transmitting light from the lamp to the target.

7. The signal level control of claim 3 that includes a control means associated with the counter for setting a maximum and a minimum count into the counter.

8. A method of controlling a video signal level that includes the steps of providing a solid state image sensor for integrating light images of a target recorded thereon and providing a video signal of the recorded image data, illuminating the target with a series of light pulses during each imaging sequence, passing the video output signals from the imager through a variable gain amplifier, controlling the gain of the amplifier to maintain signal level of the video output thereof within a given range, changing the number of light pulses from the lamp during each illumination sequence when the gain of the amplifier falls above or below the given range.

9. The method of claim 8 including the further step of adjusting the lower limit of said range so that the number of pulses are decreased before the image sensor is saturated with light.

10. The method of claim 8 that further includes the step of enabling and disabling the lamp drive during each imaging sequence so that a light image of the target is recorded by the image sensor during each video field.

11. The method of claim 8 that includes the further step of transmitting light from the lamp to the target by a fiber bundle.

12. The method of claim 11 that includes the further step of mounting both the fiber bundle and the image sensor in the distal end of an endoscopic insertion tube.

* * * * *